United States Patent
Lee et al.

(10) Patent No.: US 11,445,265 B2
(45) Date of Patent: Sep. 13, 2022

(54) ARTIFICIAL INTELLIGENCE DEVICE

(71) Applicant: LG ELECTRONICS INC., Seoul (KR)

(72) Inventors: Taeho Lee, Seoul (KR); Boseop Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 291 days.

(21) Appl. No.: 16/657,733

(22) Filed: Oct. 18, 2019

(65) Prior Publication Data

US 2020/0059700 A1 Feb. 20, 2020

(30) Foreign Application Priority Data

Sep. 20, 2019 (KR) .................. 10-2019-0116046

(51) Int. Cl.
| | | |
|---|---|---|
| *H04N 21/488* | (2011.01) | |
| *G10L 15/16* | (2006.01) | |
| *G10L 15/18* | (2013.01) | |
| *G10L 15/24* | (2013.01) | |
| *G10L 15/26* | (2006.01) | |
| *G10L 15/22* | (2006.01) | |

(52) U.S. Cl.
CPC ......... *H04N 21/4884* (2013.01); *G10L 15/16* (2013.01); *G10L 15/1815* (2013.01); *G10L 15/24* (2013.01); *G10L 15/26* (2013.01); *G10L 2015/228* (2013.01)

(58) Field of Classification Search
CPC . H04N 21/4884; G10L 15/16; G10L 15/1815; G10L 15/24; G10L 15/26; G10L 2015/228
See application file for complete search history.

(56) References Cited

U.S. PATENT DOCUMENTS

| | | | | |
|---|---|---|---|---|
| 2017/0262995 | A1* | 9/2017 | Li | ............... G06N 3/0454 |
| 2017/0262996 | A1* | 9/2017 | Jain | ............... G06K 9/4671 |
| 2018/0277142 | A1* | 9/2018 | Veeramani | ............. G06F 40/58 |
| 2019/0180747 | A1 | 6/2019 | Back et al. | |
| 2020/0175335 | A1* | 6/2020 | Li | ............... G06N 3/0481 |
| 2020/0219517 | A1* | 7/2020 | Wang | ............... G10L 15/075 |
| 2020/0380976 | A1* | 12/2020 | Lee | ............... G10L 15/22 |
| 2021/0012769 | A1* | 1/2021 | Vasconcelos | ........... G10L 15/24 |

FOREIGN PATENT DOCUMENTS

| | | |
|---|---|---|
| KR | 10-2005-0058161 A | 6/2005 |
| KR | 10-1881862 B1 | 7/2018 |
| KR | 10-2019-0067638 A | 6/2019 |
| KR | 10-2019-0094314 A | 8/2019 |
| KR | 10-2019-0095620 A | 8/2019 |

* cited by examiner

*Primary Examiner* — Michelle M Koeth
(74) *Attorney, Agent, or Firm* — Birch, Stewart, Kolasch & Birch, LLP

(57) ABSTRACT

An AI device is provided. The AI device includes a content output interface to output video data contained in content and voice data contained in the content, and a processor to control the content output interface to acquire a voice recognition result by providing, to a voice recognition model, content extraction information including at least one of video information acquired from the video data in the content or tag information of the content and the voice data, and control the content output interface to output the voice recognition result.

10 Claims, 6 Drawing Sheets

|       | Tag_1 | Tag_2 | ... | Tag_n |
|-------|-------|-------|-----|-------|
| Tag_1 | 200   | 100   |     |       |
| Tag_2 |       | ⋱     |     |       |
| ⋮     |       |       | ⋱   |       |
| Tag_n |       |       |     | 157   |

| | model 1 wrong | model 1 right |
|---|---|---|
| model 2 wrong | 29 | 1 |
| model 2 right | 11 | 9959 |

| | model 1 wrong | model 1 right |
|---|---|---|
| model 2 wrong | 15 | 15 |
| model 2 right | 25 | 9945 |

How to detect a significant drop in the error rate

· Is 30 errors in 10,000 test cases significantly better than 40 errors?
  - It all depends on the particular errors!
  - The Mcnemar test uses the particular errors and can be much more powerful than a test that just uses the number of errors.

Convolutional nets for digit recognitaion [16 min]

agin. Model one is making 40 hours, model two is agin. Model one is making 40 hours, model two is

ARTIFICIAL INTELLIGENCE DEVICE

CROSS-REFERENCE TO RELATED APPLICATIONS

This application claims priority under 35 U.S.C. 119 and 365 to Korean Patent Application No. 10-2019-0116046, filed on Sep. 20, 2019 in the Korean Intellectual Property Office, the disclosure of which is incorporated herein by reference.

FIELD

The present disclosure relates to an artificial intelligence (AI) device capable of generating a subtitle using voice data of content together with video data of the content.

BACKGROUND

Artificial Intelligence, which is one field in a computer science and an information technology to study and research a manner allowing a computer to perform thinking, learning, or self-developing based on human intelligence, refers to allow the computer to emulate the intelligent behavior of a human being.

In addition, the artificial intelligence does not exist in itself, but is directly/indirectly significantly associated with other fields of a computer science. Especially, currently, artificial intelligence elements have introduced into several fields of the information technology, and have been actively attempted to be utilized in solving problems in relevant fields.

Meanwhile, technologies have been actively studied and researched to perceive and learn the surrounding situation using Artificial Intelligence, to provide information desired by the user in a desired form, or to perform an operation or function desired by the user.

In addition, an electronic device to provide such various operations and functions may be named an Artificial intelligence (AI) device.

Recently, an automatic subtitle generating function has been provided with respect to moving picture content. However, such an automatic subtitle generating function shows inferior performance because of generating a subtitle only using the voice data of the content. Especially, when there are words having different meanings (similar words) and similar pronunciations and words having different meanings (same words) and the same pronunciation, incorrect subtitles are often generated.

SUMMARY

The present disclosure is provided to solve the problems, and an aspect of the present disclosure is to provide an AI device capable of generating a subtitle using voice data in content together with video data in the content.

According to an embodiment of the present disclosure, an AI device includes a content output device to output video data contained in content and voice data contained in the content, and a processor to acquire a voice recognition result by providing, to a voice recognition model, content extraction information including at least one of video information acquired from the video data in the content or tag information of the content and the voice data, and control the content output device to output the voice recognition result.

DETAILED DESCRIPTION

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-Driving

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

eXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

Figure 1:
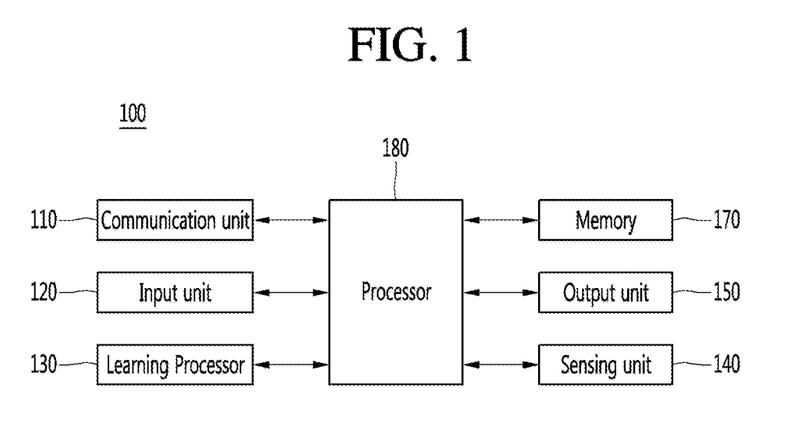
FIG. 1 illustrates an AI device according to an embodiment of the present disclosure.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
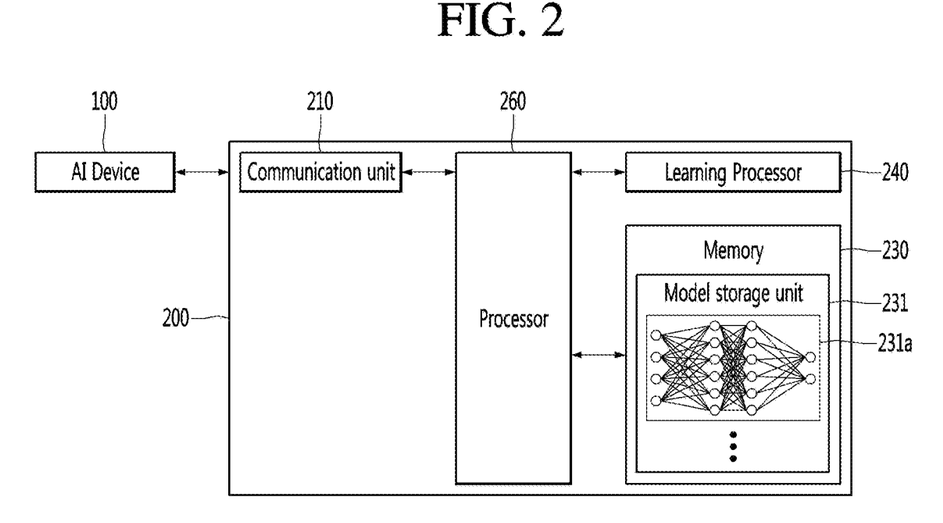
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
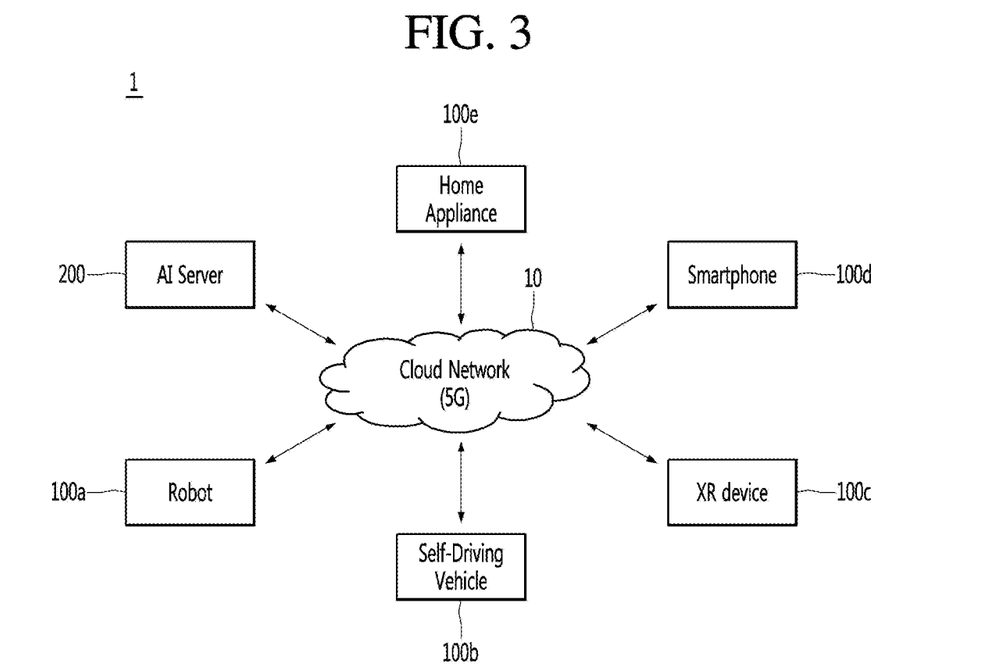
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

AI+ Robot

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

AI+Self-Driving

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

AI+XR

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

AI+Robot+Self-Driving

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

AI+Robot+XR

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time step of the robot 100a interworking remotely through the external device such as the XR device 100c, adjust the self-driving travel path of the robot 100a through interaction, control the operation or driving, or confirm the information about the surrounding object.

AI+Self-Driving+XR

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

In this specification, the term of "artificial intelligence device 100" may be used interchangeably with the term of "AI device 100".

Figure 4:
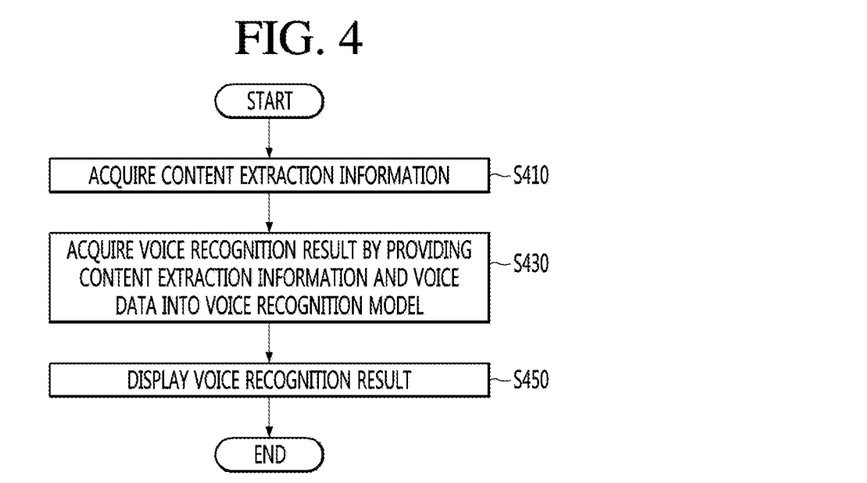
FIG. 4 is a view illustrating an operating method of an AI device, according to an embodiment of the present disclosure.

FIG. 4 is a view illustrating an operating method of an AI device, according to an embodiment of the present disclosure.

As illustrated in FIG. 4, according to an embodiment of the present disclosure, the operating method of the display device includes acquiring content extraction information including at least one of video information acquired from video data of the content or tag information of the content (S410), acquiring a voice recognition result by providing the content extraction information and the voice data to a voice recognition model (S430), and displaying the voice recognition result (S450).

Figure 5:
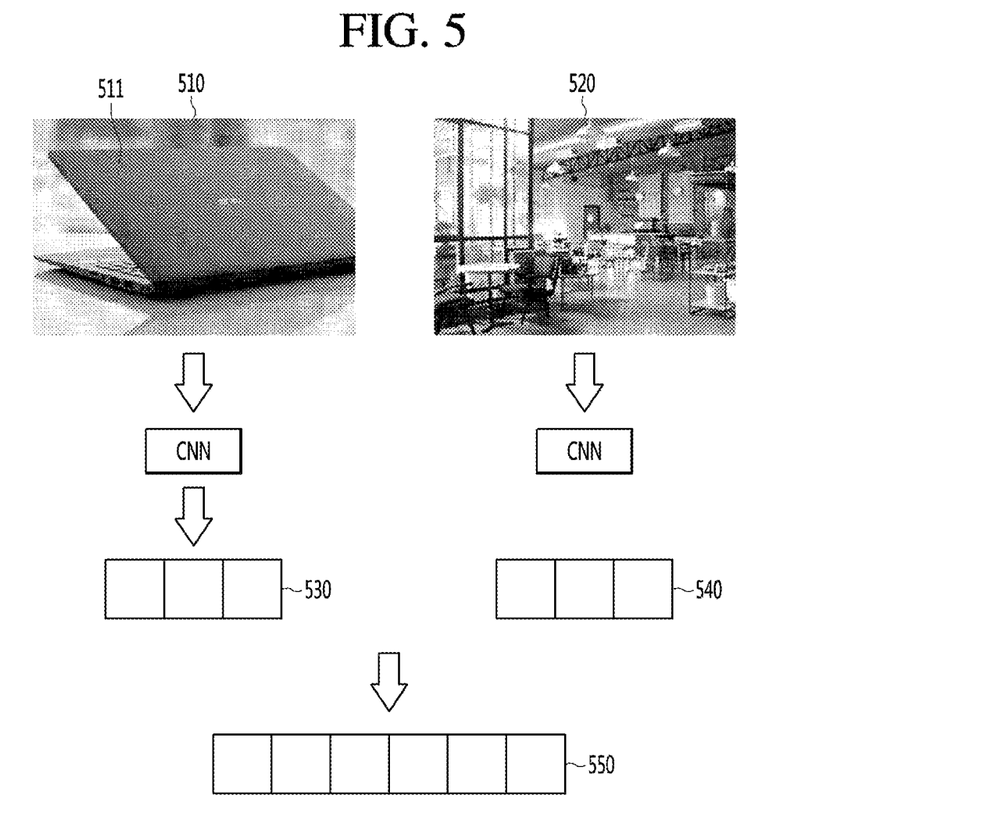
FIG. 5 is a view illustrating a method for acquiring video information of content extraction information.

FIG. 5 is a view illustrating a method for acquiring video information of the content extraction information.

The content may include video data and voice data.

In addition, the content may be a moving picture. In this case, the video data may refer to moving picture data.

A content output device may output video data contained in the content and voice data contained in the content.

In detail, the content output device may include a display and a sound output device.

In this case, the display may display the video data contained in the content under the control of the processor. In addition, the display may display a voice recognition result together with the content.

In addition, the sound output device may output the voice data contained in the content under the control of the processor. To this end, the sound output device may include a speaker.

Meanwhile, the content output device may include a communication device. In this case, the communication device may include a communication circuit to communicate with another device.

The content output device may output the video data contained in the content and the voice data contained in the content. In detail, the content output device may transmit content (the video data contained in the content and the voice data contained in the content) to another device.

In addition, the content output device may display the voice recognition result together with the content. In detail, the content output device may transmit the voice recognition result to another device together with the content.

Meanwhile, the content extraction information may include the video information.

In this case, the video information may be extracted from the video data to explain the video.

In detail, the processor may extract the video data from the content. When the video data is moving picture data, the processor may extract moving picture data, which is present in a specific frame, from the moving picture data.

Meanwhile, the video information may include an object 511 in video data 510. In detail, the processor may extract the object 511 from the video data 510 by recognizing an object for the video data 510. In detail, the processor may extract a laptop computer from the video data 510 by recognizing the object for the video data 510.

In addition, the video information may include a text in the video data. In detail, the processor may extract the text from the video data 510 by recognizing a text for the video data 510. In detail, the processor may extract a text of "laptop computer" from the video data 510 by recognizing the text for the video data 510.

In addition, video information may include description information on a scene of video data 520. In this case, the description information on the scene may refer to the explanation about the scene, which is extracted using various elements (an object, a text, a background, lighting, a structure, or a layout) in the scene. The description information on the scene may be interchangeably used with the term "scene understanding information".

In detail, the processor may extract an object and a text from the video data 510 by recognizing the object and the text for the video data 510.

In addition, the processor may acquire the description information on the scene using the object and the text in the video data 510. For example, the processor may acquire the description (café) on the scene by using a table, a chair, lighting, the layout of the table, or text "coffee" in the video.

Meanwhile, the extraction of the video information may be performed by using an AI model (for example, CNN).

In detail, the processor may provide the video data 510 to a first AI model to acquire at least one of an object or a text included in the video data 510. In this case, the first AI model may output a feature vector 530 representing at least one of the object or the text contained in the video data 510.

In addition, the processor may provide the video data 520 to a second AI model to acquire description information of a scene of the video data 520. In this case, the second AI model may output the feature vector 540 representing the description information of the scene of the video data 520.

In addition, the video information may include a video information feature vector 550 formed by combining the feature vector 530 representing at least one of the object or the text and the feature vector 540 representing the description information of the scene.

Meanwhile, the video information feature vector 550 is provided only for illustrative purpose, and video information may be expressed in various forms.

Figure 6:
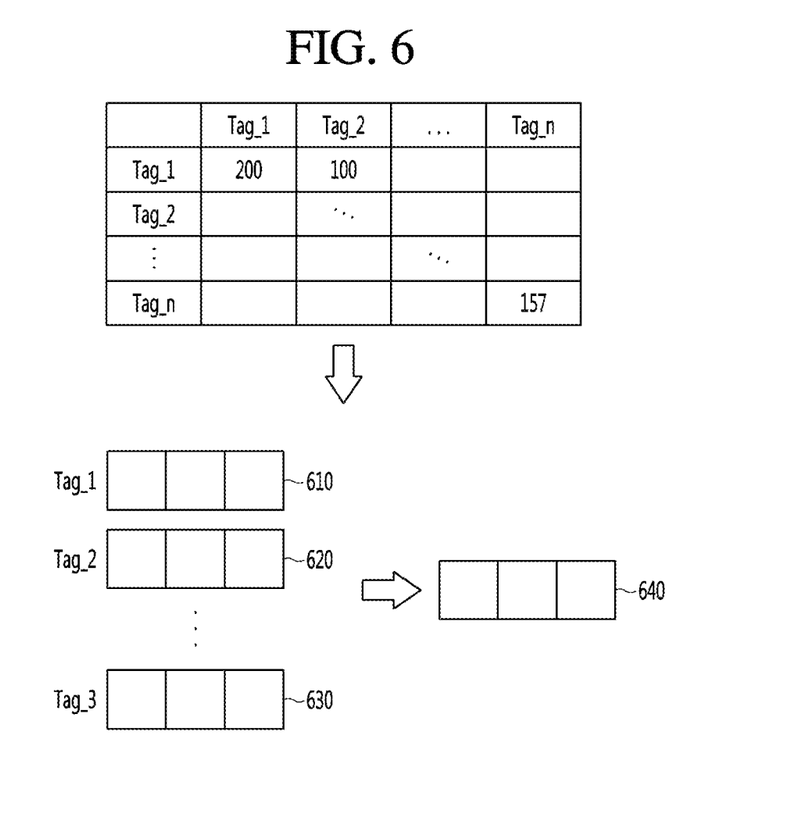
FIG. 6 is a view illustrating a method for acquiring tag information of content from content extraction information according to an embodiment of the present disclosure.

FIG. 6 is a view illustrating a method for acquiring tag information of content from content extraction information according to an embodiment of the present disclosure.

The tag information, which is information provided by a content producer or a content distributor together with content, may include various elements. In more detail, the tag information may include at least one of a title of the content, a subject of the content, or a description of the content.

Meanwhile, the processor may acquire tag information. In this case, various elements 610, 620, and 630 included in the tag information may be represented in the form of one clip vector 640. In this case, the clip vector 640 is provided only for illustrative purpose of expressing tag information, and the tag information may be expressed in various forms.

Meanwhile, the tag information may be vectorized in the form of the clip vector 640 based on the frequency of simultaneous appearance of tag information for each image. In this case, Global Vectors for Word Representation (GloVe) may be used.

Figure 7:
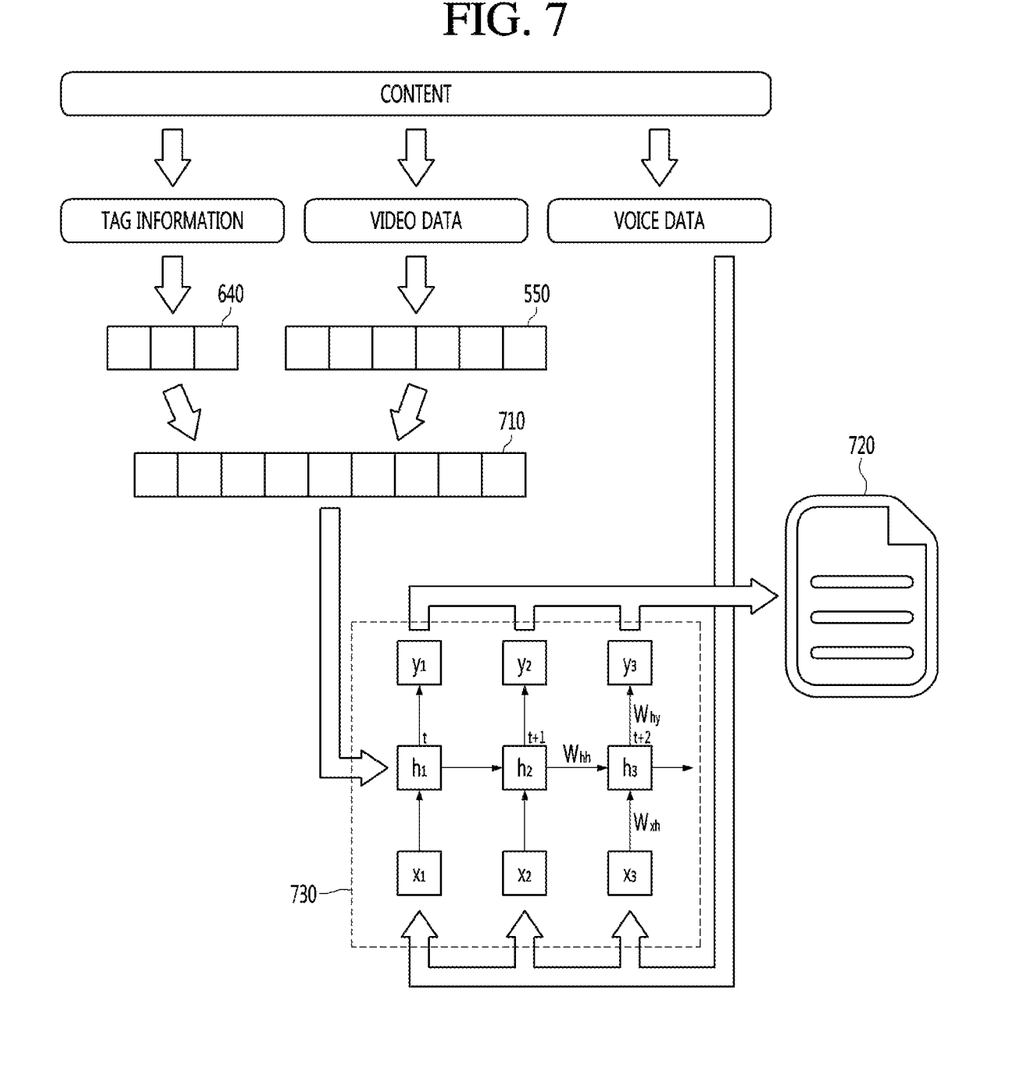
FIG. 7 is a view illustrating a method for acquiring a voice recognition result using content extraction information and video data according to an embodiment of the present disclosure.

FIG. 7 is a view illustrating a method for acquiring a voice recognition result using content extraction information and video data according to an embodiment of the present disclosure.

Meanwhile, the processor may acquire content extraction information including at least one of video information or tag information, and may provide the content extraction information to the voice recognition model.

In detail, the processor may generate one content extraction vector 710 acquired by combining the video information feature vector 550 with the clip vector 640, and may provide the content extraction vector 710 to a voice recognition model 730.

In addition, the processor may provide voice data to the voice recognition model 730 together with content extraction information.

The following description will be made regarding the voice recognition model 730.

The voice recognition model 730 may include an Recurrent Neural Network (RNN).

In detail, the voice recognition model 730 may include an RNN trained using video data serving as an input value and a language, which serves as an output value, corresponding to the voice data.

In this case, the language may an answer that the RNN has to infer using the voice data.

Accordingly, a learning device may provide voice data labeled with a language, which corresponds to the voice data, to the RNN.

In this case, the RNN may infer a function for an association between the voice data and the language by using the voice data and the language corresponding to the voice data. The parameter (a weight (Why, Whh, or Wxh), or bias) of the RNN may be determined (optimized) through the evaluation for the function inferred by the RNN.

Meanwhile, the RNN may include an input layer, an output layer, and a hidden layer.

In addition, the RNN may transfer the result value of the hidden layer to a next time step. The result value transferred from the RNN to the next time step as described above may be expressed as a hidden state.

In detail, the hidden layer may output the result value by using voice data input through the input layer, a hidden state at a previous time step, and a weigh for the RNN.

Accordingly, the result value may be output, as the voice recognition result (language corresponding to the voice data), through the output layer. In addition, the result value may be transferred to the next time step, as the hidden state at a present time step.

In other words, the hidden state exerts an influence on calculating a result value. In addition, the hidden state is transferred to the next time step and used for calculating a result value at the next time step. Accordingly, when an initial hidden state is differently set, a result value output through the hidden layer may be varied. When the initial hidden state is differently set, the same sound may be interpreted as having a different meaning and output.

Accordingly, the learning device may train an RNN while changing the initial hidden state.

In detail, in the state that a first initial hidden state corresponding to first content extraction information is set, the RNN may be trained by using first training voice data corresponding to first content extraction information and a language labeled on the first training voice data.

In more detail, the learning device may extract the first content extraction information from first content and may extract first training voice data from the first content.

In addition, the learning device may train the RNN by setting the first initial hidden state, which corresponds to the first content extraction information, for the RNN, and labeling the language on the first training voice data.

For example, when the first content is a cooking show, the first content extraction information may include the characteristic of the cooking show. In this case, the learning device may set a first initial hidden state corresponding to the characteristic of the cooking show and may label a language of "Pie (food name) came out?" on voice data uttered as "Pie (food name) came out?", thereby training the RNN.

The RNN trained using the first training voice data may be trained using second training voice data, which corresponds to second content extraction information, and a language labeled on the second training voice data, in the state that a second initial hidden state corresponding to the second content extraction information is set.

In more detail, the learning device may extract the second content extraction information from the second content, and extract the second training voice data from the second content.

In addition, the learning device may train the RNN by setting the second initial hidden state, which corresponds to the second content extraction information, for the RNN, and labeling the language on the second training voice data.

For example, when the second content is a math lecture show, the second content extraction information may include characteristics of the math lecture show. In this case, the learning device may set the second initial hidden state corresponding to the characteristic of the math lecture show and may label a language of "π (circumferential rate) came out?" on voice data uttered as "Pie (food name) came out?", thereby training the RNN.

In addition, a weight (Why, Whh, or Wxh) or a bias may be set through the above-described training process such that the RNN outputs a language of "Pie (food name) came out?" when receiving voice data of "Pie (food name) came out?" in the state that the first initial hidden state is set, and output a language of "π (circumferential rate) came out?" when receiving voice data of "Pie (food name) came out?" in the state that the second initial hidden state is set.

Meanwhile, the RNN trained in such a manner may be named a "voice recognition model", and the voice recognition model may be installed in an AI device 730.

Meanwhile, the processor may acquire content extraction information from content and may set an hidden state, which corresponds to the acquired content extraction information, for the voice recognition model 730.

In addition, the processor may acquire a voice recognition result by inputting voice data into the voice recognition model 730 set with the initial hidden state corresponding to content extraction information 710. In this case, the voice recognition result may be a language corresponding to voice data.

In this case, the voice recognition model may calculate a hidden state at time step "t" and a voice recognition result at the time step "t" using the initial hidden state and the voice data at the time step "t".

In more detail, the voice recognition model may output a result value at the time step "t" using an initial hidden state, voice data "x1" at time step "t", and a weight. In this case, the result value may be output as the voice recognition result (language corresponding to the voice data) (y1) through the output layer. In addition, the result value may be transferred to time step "t+1", as the hidden state at the time step "t".

In this case, the voice recognition model may calculate a hidden state at time step "t+1" and a voice recognition result at the time step "t+1" using the hidden state at the time step "t" and the voice data at the time step "t+1".

In more detail, the voice recognition model may output a result value at the time step "t+1" using the hidden state at the time step "t", voice data "x2" at time step "t+1", and a weight. In this case, the result value may be output as the voice recognition result (language corresponding to the voice data) (y2) through the output layer. In addition, the result value at time step "t+1" may be transferred to the time step "t+2", as the hidden state at a present time step "t+1".

When the initial hidden state is set as described above, the initial hidden state continuously exerts an influence on a next time step, so the voice recognition results y1, y2, and y3 may be output while reflecting the initial hidden state in the voice recognition results y1, y2, and y3.

In addition, since the initial hidden state corresponds to the content extraction information, and the content extraction information reflects the characteristics of the content, the voice recognition model may interpret the meaning of the voice data by reflecting the characteristics of the content.

For example, when the content information included in the content extraction information is "math lecture", the voice recognition model may output a language of "π (circumferential rate) came out?" for voice data of "Pie (food name) came out?", Meanwhile, when the content information included in the content extraction information is "cooking show", the voice recognition model may output a language of "pie (circumferential rate) came out?" for voice data of "pie (food name) came out?", In addition, when the video information included in the content extraction information includes an object "pie" or a text "pie", the voice recognition model may output the language of "pie (circumferential rate) came out?" for voice data of "pie (food name) came out?", In addition, when the description information of the scene included in the content extraction information is café, the voice recognition model may output the language of "pie (circumferential rate) came out?" for voice data of "pie (food name) came out?".

In addition, when the description information of the scene included in the content extraction information is a classroom, the voice recognition model may output the language of "pie (circumferential rate) came out?" for voice data of "pie (food name) came out?", Although the conventional voice recognition model selects a word having the highest score based on the connection of words before and after, a sentence that the word belongs to, and the context of the sentence, the conventional voice recognition model has a limitation in predicting words using only voice data.

Accordingly, the conventional voice recognition model shows inferior performance, and generates an incorrect subtitle when there are words having different meanings (similar words) and similar pronunciations and words having different meanings (same words) and the same pronunciation.

However, according to the present disclosure, since a language corresponding to voice data is predicted by additionally reflecting tag information of moving picture content and vision information in a moving picture, the voice recognition performance may be improved, and superior performance is shown even if there are words having different meanings (similar words) and similar pronunciations and words having different meanings (same words) and the same pronunciation.

Hereinafter, operations will be described in various situations.

First, the following description will be made regarding a situation that mutually different video information is extracted from a plurality of scenes in one content.

The processor may set, for an RNN, a first initial hidden state corresponding to video information extracted from a first scene of the content, and provide first voice data, which is output from the first scene, to the RNN having the first initial hidden state, thereby acquiring the voice recognition result corresponding to the first voice data.

For example, the processor may set, for an RNN, the first initial hidden state corresponding to video information extracted from a first scene (having a pie) of a specific show. In addition, the processor may provide the first voice data output, which is output from the first scene, to the RNN having the first initial hidden state, thereby acquiring the voice recognition result corresponding to the first voice data.

The processor may set, for an RNN, a second initial hidden state corresponding to video information extracted from a second scene of content, and provide second voice data, which is output from the second scene, to the RNN having the second initial hidden state, thereby acquiring the voice recognition result corresponding to the second voice data.

For example, the first scene (a scene having a pie) is changed to the second scene (a scene having a bicycle) over time. In this case, the processor may set, for an RNN, the second initial hidden state corresponding to video information (bicycle) extracted from a second scene (having a bicycle) of a specific show. In addition, the processor may provide the second voice data, which is output from the second scene, to the RNN having the second initial hidden state, thereby acquiring the voice recognition result corresponding to the second voice data.

The following description will be made regarding the situation that tag information is extracted from one content, and mutually different video information is extracted from a plurality of scenes of one pieces of content.

The processor may set, for an RNN, a third initial hidden state corresponding to tag information of content and video information extracted from a first scene of the content, and provide third voice data, which is output from a third scene, to the RNN having the third initial hidden state, thereby acquiring the voice recognition result corresponding to the third voice data.

For example, the processor may set, for an RNN, the third initial hidden state corresponding to the title (today show is "cooking king") of a specific show and video information (food; pie) extracted from a first scene (having a pie) of the specific show. In addition, the processor may provide the first voice data, which is output from the first scene, to the RNN having the third initial hidden state, thereby acquiring the voice recognition result corresponding to the first voice data.

In addition, the processor may set, for an RNN, a fourth initial hidden state corresponding to tag information of content and video information extracted from the second scene of the content, and provide second voice data, which is output from the second scene, to the RNN having the fourth initial hidden state, thereby acquiring the voice recognition result corresponding to the second voice data.

For example, the first scene (a scene having a pie) is changed to the second scene (a scene having a bicycle) over time. In this case, the processor may set, for an RNN, the fourth initial hidden state corresponding to the title (today show is "cooking king") of a specific show and video information (food; bicycle) extracted from a second scene (having a bicycle) of the specific show. In addition, the processor may provide the second voice data, which is output from the second scene, to the RNN having the fourth initial hidden state, thereby acquiring the voice recognition result corresponding to the second voice data.

The following description will be made regarding the situation that mutually different tag information is extracted from multiple pieces of content.

The processor may set, for an RNN, a fifth initial hidden state corresponding to first tag information of the first content, and provide voice data to the RNN having the fifth initial hidden state, thereby acquiring the voice recognition result corresponding to the voice data.

For example, the processor may set, for an RNN, the fifth initial hidden state corresponding to tag information (food) extracted from the subject (cooking lecture) of a specific show. In addition, the processor may provide the voice data to the RNN having the fifth initial hidden state, thereby acquiring the voice recognition result corresponding to the voice data.

In addition, the processor may set, for an RNN, a sixth initial hidden state corresponding to second tag information of the second content, and provide voice data to the RNN having the sixth initial hidden state, thereby acquiring the voice recognition result corresponding to the voice data.

For example, the processor may set, for an RNN, the sixth initial hidden state corresponding to tag information (math) extracted from the subject (math lecture) of a specific show. In addition, the processor may provide the voice data to the RNN having the sixth initial hidden state, thereby acquiring the voice recognition result corresponding to the voice data.

Meanwhile, when the voice recognition result is acquired, the processor may control a content output device to output the voice recognition result.

In detail, when the content output device includes the display, the processor may control the display to display the voice recognition result. In this case, the processor may display the voice recognition result together with the video data of the content.

In addition, when the content output device includes a communication device, the processor may transmit the voice recognition result to another apparatus through the communication device. In this case, the processor may transmit the voice recognition result together with the video data and the voice data of the content.

Meanwhile, the anther appliance may receive the voice recognition result, the video data, and the voice data. In addition, the another appliance may display the received voice recognition result and video data and may output the received voice data.

Figure 8:
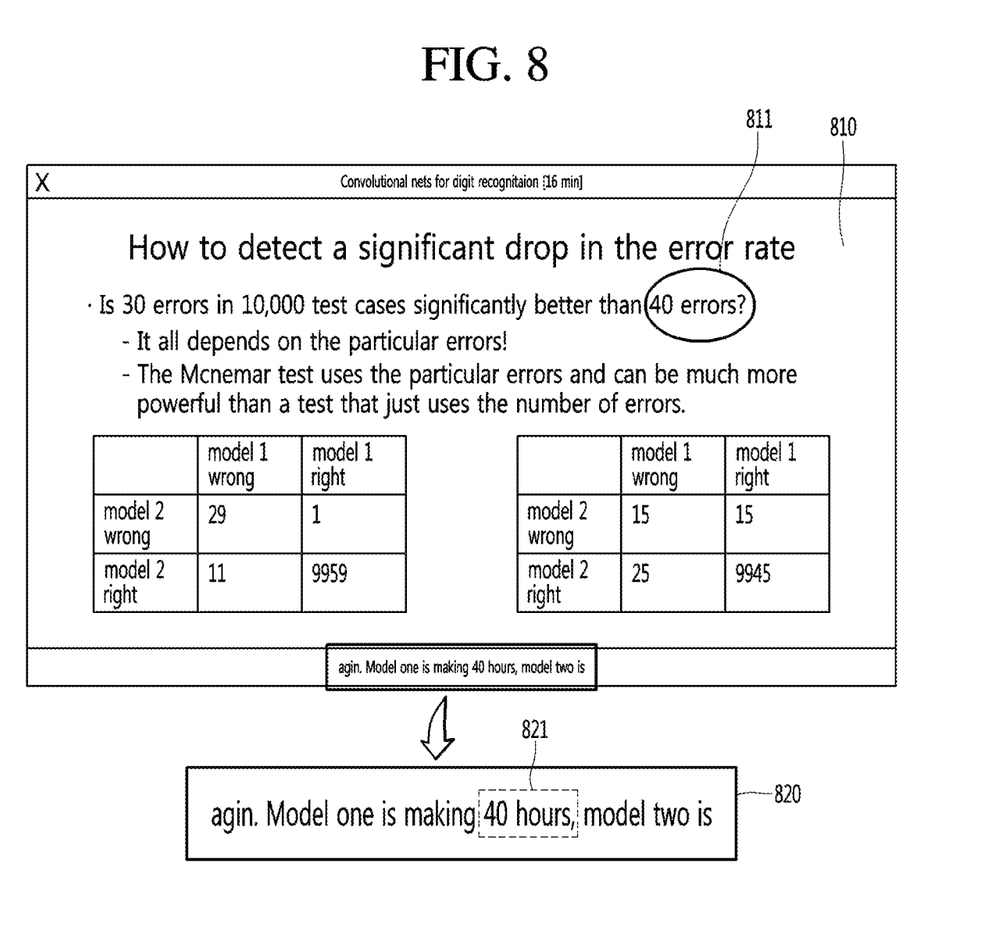
FIG. 8 is a view illustrating an operation according to the present disclosure.

FIG. 8 is a view illustrating an operation according to the present disclosure.

Currently, in the state that video data 810 is displayed, voice data of "Model one is making 40 errors model two is" is output.

However, the conventional automatic subtitle generator outputs the subtitle "Model one is making 40 hours model two is" with respect to the voice data "Model one is making 40 errors model two is".

This occurs because "makes 40 hours" is more frequently used than "making 40 errors", so a voice recognizer gives a higher score to the language "40 hours 821" than the language "40 errors" for voice data "40 errors".

However, according to the present disclosure, video information of "40 errors 811" is extracted, and the extracted video information is reflected as an initial hidden state of a voice recognition model. Accordingly, the automatic subtitle generator may generate a correct subtitle. In other words, the automatic subtitle generator may output the subtitle of "Model one is making 40 errors model two is" with respect to the voice data of "Model one is making 40 errors model two is".

The following description will be made regarding an operating method of an AI device according to an embodiment of the present disclosure.

According to an embodiment of the present disclosure, an operating method of the AI device includes acquiring content extraction information including at least one of video information acquired from video data contained in the content or tag information of the content, acquiring a voice recognition result by providing the content extraction information and voice data, which is contained in the content, to a voice recognition model, and outputting the video data contained in the content, the voice data contained in the content, and the voice recognition result.

In this case, the voice recognition model may include an RNN, and the step of acquiring the voice recognition result may include the step of setting, for the RNN, an initial hidden state corresponding to the content extraction information.

Meanwhile, the voice recognition model may calculate a hidden state and a voice recognition result at a time step "t" by using the initial hidden state and voice data at the time step "t", and may calculate a hidden state and a voice recognition result at a time step "t+1" by using the hidden state at the time step "t" and voice data at the time step "t+1".

In this case, in the step of acquiring the voice recognition result, the voice recognition result corresponding to the first voice data may be acquired by setting, for an RNN, a first initial hidden state corresponding to video information extracted from a first scene of the content, and providing first voice data, which is output from the first scene, to the RNN having the first initial hidden state.

Meanwhile, in the step of acquiring the voice recognition result, the voice recognition result corresponding to the first voice data may be acquired by setting, for the RNN, a second initial hidden state corresponding to tag information of the content and the video information extracted from the first scene of the content, and providing the first voice data, which is output from the first scene, to the RNN having the second initial hidden state.

Meanwhile, in the step of acquiring the voice recognition result, the voice recognition result corresponding to the voice data may be acquired by setting, for the RNN, a third initial hidden state corresponding to the tag information of the content, and providing the voice data to the RNN having the third initial hidden state.

The video information may include at least one of an object in the video data, a text in the video data, or description information of a scene.

Meanwhile, the tag information may include at least one of a title of the content, a subject of the content, or a description of the content.

In detail, the RNN may be trained by using the first training voice data corresponding to the first content extraction information and a language labeled on the first training voice data, in the state that the first initial hidden state corresponding to the first content extraction information is set, and may trained by using the second training voice data corresponding to the second content extraction information and a language labeled on the second training voice data, in the state that the second initial hidden state corresponding to second content extraction information is set.

The invention may also be embodied as computer readable codes on a computer readable recording medium. The computer readable recording medium is any data storage device that may store data which may be thereafter read by a computer system. Examples of the computer readable recording medium include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. The computer may include the controller 180 of the mobile terminal. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An artificial intelligence (AI) device comprising:
a content output interface configured to output video data contained in content and voice data contained in the content; and
a processor configured to:
acquire a voice recognition result by providing, to a voice recognition model, content extraction information including at least one of video information acquired from the video data in the content or tag information of the content and the voice data, and
control the content output interface to output the voice recognition result,
wherein the voice recognition model includes a recurrent neural network (RNN), and
wherein the processor is configured to:
set, for the RNN, an initial hidden state corresponding to the tag information of the content, and
provide the voice data to the RNN having the initial hidden state, to acquire the voice recognition result corresponding to the voice data.

2. An artificial intelligence (AI) device comprising:
a content output interface configured to output video data contained in content and voice data contained in the content; and
a processor configured to:
acquire a voice recognition result by providing, to a voice recognition model, content extraction information including at least one of video information acquired from the video data in the content or tag information of the content and the voice data, and
control the content output interface to output the voice recognition result,
wherein the voice recognition model includes a recurrent neural network (RNN), and
wherein the processor is configured to:
set, for the RNN, an initial hidden state corresponding to the tag information of the content and video information extracted from a first scene of the content; and
provide first voice data, which is output from the first scene, to the RNN having the initial hidden state, to acquire a voice recognition result corresponding to the first voice data.

3. The AI device of claim 1, wherein the video information includes:
at least one of an object in the video data, a text in the video data, or description information of a scene.

4. The AI device of claim 1, wherein the tag information included in the content extraction information includes:
at least one of a title of the content, a subject of the content, or description of the content.

5. The AI device of claim 1, wherein the RNN is:
trained by using first training voice data corresponding to first content extraction information and a language labeled on the first training voice data, in a state that a first initial hidden state corresponding to the first content extraction information is set; and
trained by using second training voice data corresponding to second content extraction information and a language labeled on the second training voice data, in a state that a second initial hidden state corresponding to the second content extraction information is set.

6. An operating method of an artificial intelligence (AI) device, the operating method comprising:

acquiring content extraction information including at least one of video information acquired from video data contained in content or tag information of the content;

acquiring a voice recognition result by providing, to a voice recognition model, the content extraction information and voice data contained in the content; and outputting the video data contained in the content, the voice data contained in the content, and the voice recognition result, wherein the voice recognition model includes a recurrent neural network (RNN), and wherein the acquiring of the voice recognition result includes:

setting, for the RNN, an initial hidden state corresponding to the tag information of the content; and providing the voice data to the RNN having the initial hidden state, to acquire the voice recognition result corresponding to the voice data.

7. An operating method of an artificial intelligence (AI) device, the operating method comprising:

acquiring content extraction information including at least one of video information acquired from video data contained in content or tag information of the content;

acquiring a voice recognition result by providing, to a voice recognition model, the content extraction information and voice data contained in the content; and outputting the video data contained in the content, the voice data contained in the content, and the voice recognition result, wherein the voice recognition model includes a recurrent neural network (RNN), and wherein the acquiring of the voice recognition result includes:

setting, for the RNN, an initial hidden state corresponding to the tag information of the content and video information extracted from a first scene of the content; and providing first voice data, which is output from the first scene, to the RNN having the initial hidden state, to acquire a voice recognition result corresponding to the first voice data.

8. The operating method of claim 6, wherein the video information includes:

at least one of an object in the video data, a text in the video data, or description information of a scene.

9. The operating method of claim 6, wherein the tag information included in the content extraction information includes:

at least one of a title of the content, a subject of the content, or description of the content.

10. The operating method of claim 6, wherein the RNN is:

trained by using first training voice data corresponding to first content extraction information and a language labeled on the first training voice data, in a state that a first initial hidden state corresponding to the first content extraction information is set; and trained by using second training voice data corresponding to second content extraction information and a language labeled on the second training voice data, in a state that a second initial hidden state corresponding to the second content extraction information is set.

* * * * *